US010205957B2

(12) United States Patent
Cheng et al.

(10) Patent No.: US 10,205,957 B2
(45) Date of Patent: Feb. 12, 2019

(54) MULTI-STANDARD VIDEO DECODER WITH NOVEL BIN DECODING

(71) Applicant: MediaTek Inc., Hsin-Chu (TW)

(72) Inventors: Chia-Yun Cheng, Zhubei (TW); Sheng-Jen Wang, Tainan (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 323 days.

(21) Appl. No.: 14/997,691

(22) Filed: Jan. 18, 2016

(65) Prior Publication Data

US 2016/0227216 A1 Aug. 4, 2016

Related U.S. Application Data

(60) Provisional application No. 62/109,806, filed on Jan. 30, 2015.

(51) Int. Cl.
*H04N 19/44* (2014.01)
*H04N 19/174* (2014.01)
*H04N 19/91* (2014.01)
*H04N 19/42* (2014.01)
*H04N 19/70* (2014.01)

(52) U.S. Cl.
CPC .......... *H04N 19/44* (2014.11); *H04N 19/174* (2014.11); *H04N 19/42* (2014.11); *H04N 19/91* (2014.11); *H04N 19/70* (2014.11)

(58) Field of Classification Search
CPC .................................................... H04N 19/44
See application file for complete search history.

(56) References Cited

U.S. PATENT DOCUMENTS

| 7,161,994 B2* | 1/2007 | Shah ................... H03M 13/00 375/341 |
| 7,167,531 B2* | 1/2007 | Greenberg ........... H03M 13/00 375/262 |
| 2005/0094729 A1* | 5/2005 | Yuan .................... H04N 19/61 375/240.16 |
| 2005/0259688 A1 | 11/2005 | Gordon |

(Continued)

FOREIGN PATENT DOCUMENTS

| CN | 1720716 A | 1/2006 |
| CN | 101072353 A | 11/2007 |

(Continued)

*Primary Examiner* — Dave Czekaj
*Assistant Examiner* — Shanika M Brumfield
(74) *Attorney, Agent, or Firm* — McClure, Qualey & Rodack, LLP

(57) ABSTRACT

An apparatus for multi-standard bin decoding in a video decoder for decoding two video coded in two different video coding standards is disclosed. The apparatus includes a first bin decoder to decode one or more first bin strings, a second bin decoder to decode one or more second bin strings, a standard change control module coupled to the first bin decoder and the second bin decoder and a system controller coupled to the standard change control module, the first bin decoder and the second bin decoder. The standard change control module or the system controller selects either a next slice or picture to be decoded by the first bin decoder or the second bin decoder based on one or more control parameters including the decoding time information.

15 Claims, 6 Drawing Sheets

(56) References Cited

U.S. PATENT DOCUMENTS

| | | | | |
|---|---|---|---|---|
| 2006/0082474 A1* | 4/2006 | Cooper | ............ | H04N 21/23432 |
| | | | | 341/50 |
| 2007/0133688 A1* | 6/2007 | Tjandrasuwita | ....... | H04N 19/61 |
| | | | | 375/240.21 |
| 2011/0001643 A1* | 1/2011 | Sze | .................... | H03M 7/4006 |
| | | | | 341/87 |
| 2011/0110435 A1* | 5/2011 | Li | ......................... | H04N 19/44 |
| | | | | 375/240.25 |
| 2011/0228858 A1* | 9/2011 | Budagavi | ............... | H04N 19/70 |
| | | | | 375/240.25 |

FOREIGN PATENT DOCUMENTS

| | | | | |
|---|---|---|---|---|
| CN | 101568030 | A | * | 10/2009 |
| CN | 101800892 | A | | 8/2010 |
| CN | 102055970 | A | | 5/2011 |
| CN | 102547294 | A | | 7/2012 |
| CN | 202602827 | A | | 12/2012 |
| WO | WO-2008037113 | A1 | * 4/2008 ......... H04N 21/4382 |

\* cited by examiner

MULTI-STANDARD VIDEO DECODER WITH NOVEL BIN DECODING

CROSS REFERENCE TO RELATED APPLICATIONS

The present invention claims priority to U.S. Provisional Patent Application Ser. No. 62/109,806, filed on Jan. 30, 2015. The U.S. Provisional Patent Application is hereby incorporated by reference in its entirety.

FIELD OF THE INVENTION

The present invention relates to multi-standard video decoding system. In particular, the present invention relates to area-efficient or high performance bin decoding design to simultaneously support different context-based entropy decoders as required by different video coding standards.

BACKGROUND

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video coding standard such as H.264/AVC and the emerging HEVC (High Efficiency Video Coding) standard. In order to maintain manageable complexity, an image is often divided into blocks, such as macroblock (MB) or LCU/CU to apply video coding. Video coding standards usually adopt adaptive Inter/Intra prediction on a block basis.

FIG. 1 illustrates an exemplary system block diagram for video decoder 100 to support HEVC video standard. High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block. A CU may begin with a largest CU (LCU), which is also referred as coded tree unit (CTU) in HEVC and each CU can be recursively split into four smaller CUs until the predefined minimum size is reached. Once the splitting of CU hierarchical tree is done, each CU is further split into one or more prediction units (PUs) according to prediction type and PU partition. Each CU or the residual of each CU is divided into a tree of transform units (TUs) to apply two-dimensional (2D) transforms.

In FIG. 1, the input video bitstream is first processed by variable length decoder (VLD) 110 to perform variable-length decoding and syntax parsing. The parsed syntax may correspond to Inter/Intra residue signal (the upper output path from VLD 110) or motion information (the lower output path from VLD 110). The residue signal usually is transform coded. Accordingly, the coded residue signal is processed by inverse scan (IS)/inverse quantization (IQ) block 112, and inverse transform (IT) block 114. The output from inverse transform (IT) block 114 corresponds to reconstructed residue signal. The reconstructed residue signal is added to reconstruction block 116 along with Intra prediction from Intra prediction block 118 for an Intra-coded block or Inter prediction from motion compensation block 120 for an Inter-coded block. Inter/Intra selection block 122 selects Intra prediction or Inter prediction for reconstructing the video signal depending on whether the block is Inter or Intra coded. For motion compensation, the process will access one or more reference blocks stored in decoded picture buffer or reference picture buffer 124 and motion vector information determined by motion vector (MV) generation block 126. In order to improve visual quality, deblocking filter 128 and Sample Adaptive Offset (SAO) filter (130) are used to process reconstructed video before it is stored in the decoded picture buffer 124. For the H.264/AVC standard, only the deblocking filter (DF) is used without the sample adaptive offset (SAO) filter.

In addition to the H.264/AVC and HEVC video coding standards, there are also other formats being used such as Window Media Video (WMV) developed by Microsoft™ and VP8/VP9 developed by Google™. On the other hand, AVS video coding is a video coding standard developed by the Audio and Video Coding Standard Workgroup of China and the format is widely used in China. The video coding tool set used for AVS is similar to that for H.264/AVC. However, the complexity of AVS is greatly reduced compared to the H.264/AVC standard. Nevertheless, the coding performance of AVS is comparable to that of H.264/AVC.

Due to the co-existing of compressed video in various video coding formats, a video decoder may have to decode various video formats in order to allow a user to watch video contents coded in different video coding formats. Furthermore, there may be a need for simultaneously decoding two compressed video data coded in different video coding formats. For example, a user may be watching two video sequences displayed on a TV screen in a main/sub-picture (i.e., picture-in-picture) or split screen arrangement, where one sequence is coded in one video coding format while the other sequence is coded in a different format.

FIG. 2 illustrates a typical TV system with built-in audio/video decoder. As shown in FIG. 2, the system uses a CPU bus and DRAM (dynamic random access memory) bus, where the CPU bus is used for CPU command and communication in order to control other modules. The external memory storage (210) is used to store reference pictures for video decoding, decoded pictures for display and other data. The external memory often uses DRAM (dynamic random access memory) and external memory access engine (220) is used to connect the external memory storage to the data bus. The system may include a CPU (230), a video decoder (240), an audio engine (250) and a display engine (260). The video decoder will perform the task of video decoding for compressed video data. The audio engine will perform the task of audio decoding for compressed audio data. The audio engine may also support other audio tasks such as generating audio prompt for user interface. The display engine is responsible for processing video display and generating on-screen display information. For example, the display engine may generate graphic or text information for user interface. The display engine is also responsible for scaling and combining two decoded video data for main window and sub-window display, or split screen display. The CPU may be used to initialize the system, control other subsystems, or provide user interface for the TV system.

In order to support simultaneous multi-standard video decoding and display, the video decoding system may be configured to decode one coded video data and then switch to decode another coded video data. For example, if the video decoder system needs to simultaneously decode a first video bitstream coded in the HEVC format and a second video bitstream coded in the AVS format, the decoder system may decode one HEVC slice and switch to decode an AVS slice. The decoded HEVC slices and AVS slices can be temporarily stored in output picture buffer. The display engine may access the pictures for picture in picture display or split screen display.

In various newer video standards, context based entropy coding has been widely used. For example, Context-based Adaptive Binary Arithmetic Coder (CABAC) has been used for H.264/AVC, HEVC and AVS. CABAC encoding process consists of three steps: binarization, context modeling, and binary arithmetic coding (BAC). During the binarization stage, the syntax elements (SEs) generated by the coding system, such as quantized transform coefficients or motion information, are binarized into bin strings (i.e., binary strings). Each bit position in the bin string is called a "bin". Each bin is then processed according to either regular coding mode or bypass mode. During the context modeling stage, the statistics of the coded syntax elements are utilized to update the probability models (i.e., context model) of regular bins. For bins in the bypass mode, context modeling is skipped and the bin is passed directly to a bypass coding engine. In binary arithmetic coding, the value of the bin is used to update the context variable if applicable, and bits are output into the bitstream.

While context based entropy coding is used for H.264/AVC, HEVC, VP8, VP9, AVS and the emerging AVS2, each video coding standard has its own variation of context based entropy coding. In order to support multiple video coding standards, a straightforward approach would require all individual bin decoders, which may noticeably increase the system cost. Therefore, it is desirable to develop area efficient (i.e., smaller silicon area) or high-performance bin decoders for multi-standard video decoder.

BRIEF SUMMARY OF THE INVENTION

An apparatus for multi-standard bin decoding in a video decoder for decoding two video coded in two different video coding standards is disclosed. The apparatus comprises a first bin decoder to decode one or more first bin strings, a second bin decoder to decode one or more second bin strings, a standard change control module coupled to the first bin decoder and the second bin decoder and a system controller coupled to the standard change control module, the first bin decoder and the second bin decoder. The standard change control module or the system controller selects either a next slice or picture to be decoded by the first bin decoder or the second bin decoder based on one or more control parameters including the decoding time information. Each first bin string is generated according to a first video coding standard and each second bin string is generated according to a second video coding standard. The standard change control module configures the first bin decoder or the second bin decoder to decode a current slice or picture according to whether a respective video coding standard associated with a current bin string for a current slice or picture coded in the first video coding standard or the second video coding standard, and receives decoding time information from the first bin decoder or the second bin decoder for the current slice or picture after being decoded. The system controller provides the respective video coding standard associated with the current bin string to the standard change control module, and receives the decoding time information.

The first video coding standard may correspond to AVS video coding standard and the second video coding standard may correspond to HEVC (High Efficiency Video Coding) standard.

When the decoding time information is associated with each slice, if a first decoding time of the first bin decoder for a current first slice in a current first picture is shorter than a second decoding time of the second bin decoder for a previous slice in a current second picture and if timing budget for the current first picture is adequate, the standard change control module selects the second bin decoder for the next second slice according to one embodiment.

The system controller may also receives user control to terminate or resume bin decoding for the first bin strings associated with the first video coding standard or the second bin strings associated with the second video coding standard. The first bin decoder and the second bin decoder may share the same context table storage associated with the first video coding standard and the second video coding standard.

In another embodiment, each of the two bin decoders comprises a context local buffer, a short term neighbor buffer, an address generator and a bin decoding unit. The two bin decoders share a common context local buffer, short term neighbor buffer or address generator. The context local buffer is used to store a local context table fetched from context table storage. The short term neighbor buffer is used to store short-term neighbor information associated with a current processing unit within a larger unit coded in a first or second video coding standard. The address generator is used to generate address for fetching the local context table from the context table storage. The bin decoding unit is coupled to the context local buffer to apply context-based bin decoding to each bin string using only the local context table stored in the context local buffer.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
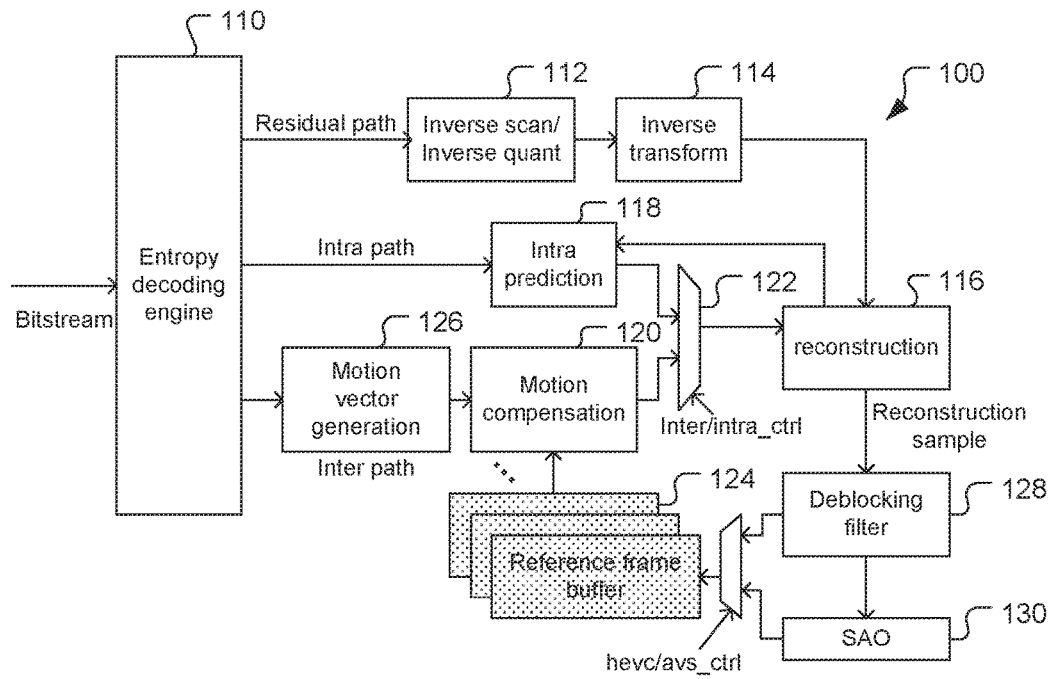
FIG. 1 illustrates an exemplary system block diagram for video decoder to support HEVC (High Efficiency Video Coding) video standard.
Figure 2:
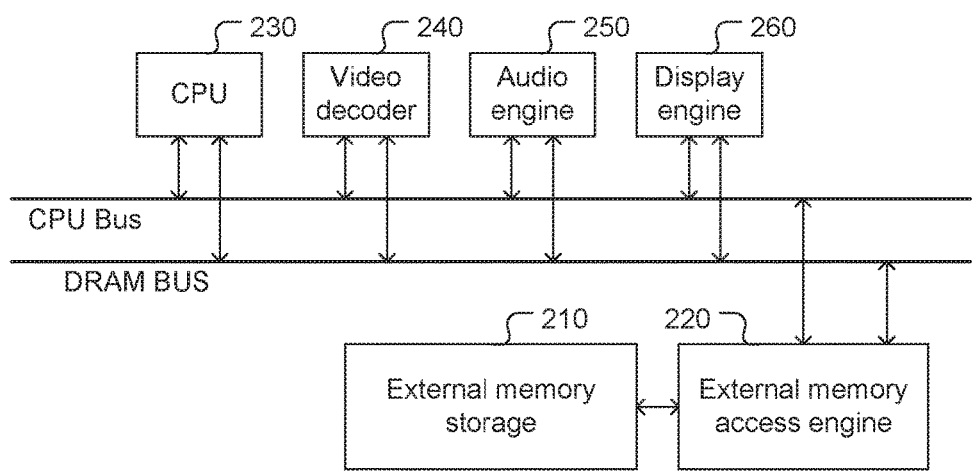
FIG. 2 illustrates a typical TV system with built-in audio/video decoder.
Figure 3A:
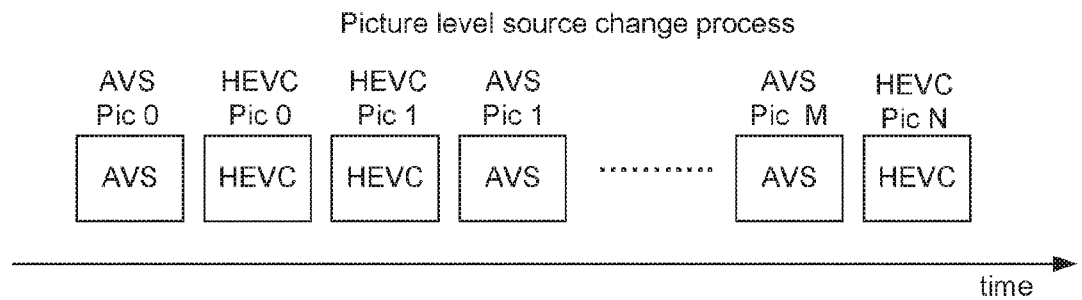
FIG. 3A illustrates an example of picture level source switching process, where the decoder source is switched between AVS and HEVC bitstreams.
Figure 3B:
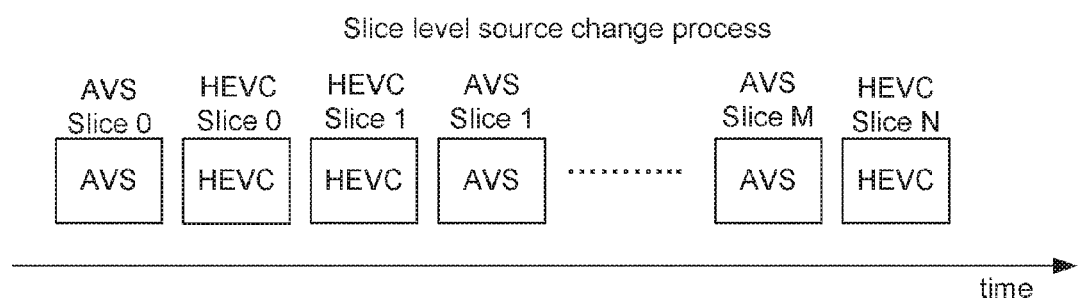
FIG. 3B illustrates an example of slice level source switching process, where the decoder source is switched between AVS and HEVC bitstreams.

In order to support simultaneous multi-standard video decoding and display, the video decoding system may be configured to decode one coded video data and then switch to decode another coded video data. FIG. 3A illustrates an example of picture level source switching process, where the decoder source is switched between AVS and HEVC bitstreams. The decoder source switching process may also be applied at a slice level, where the decoder system may decode one AVS slice and then switch to decode one HEVC slice. FIG. 3B illustrates an example of slice level source switching process.

Figure 4:
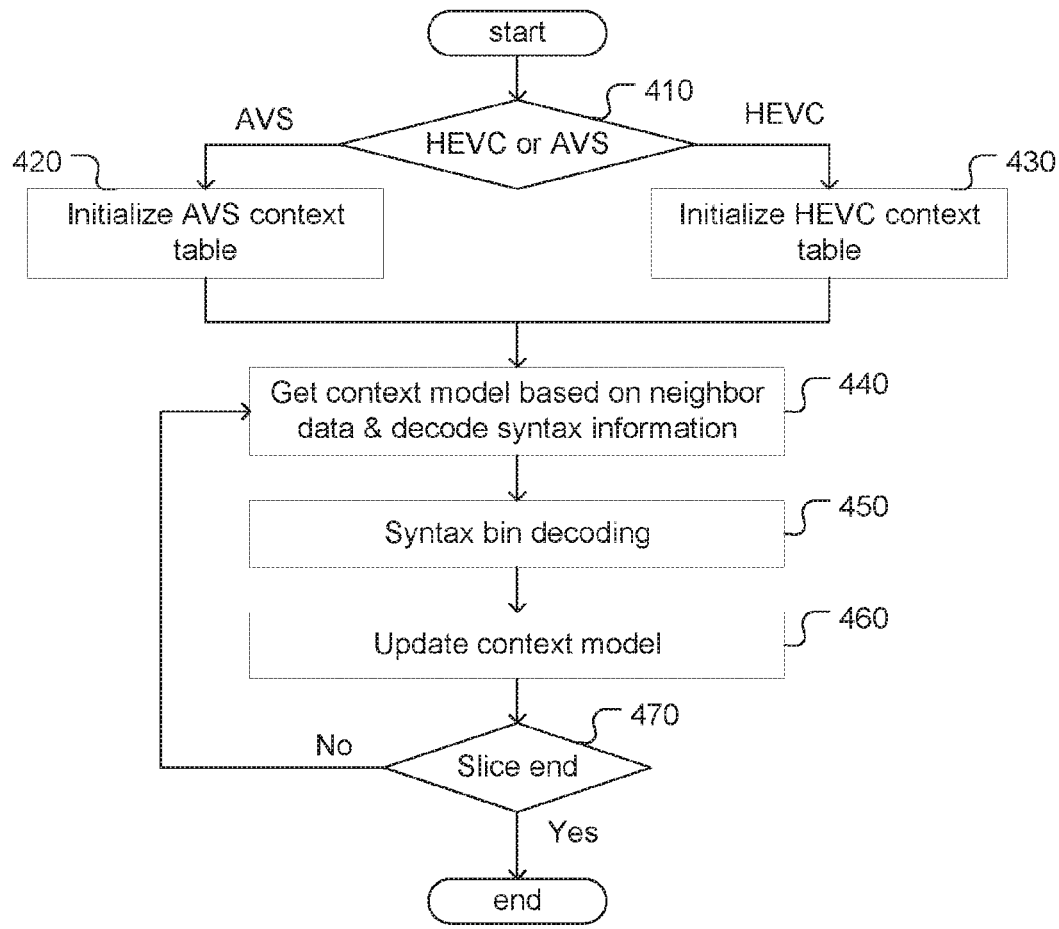
FIG. 4 illustrates an example of flowchart for a bin decoder to support both HEVC and AVS coding standard at the same time.

As mentioned before, a straightforward approach to bin decoder for multi-standard video decoder would require individual bin decoders for all intended video standards. This may noticeably increase the system cost. Therefore, it is desirable to develop an area efficient (i.e., smaller silicon area) or high-performance bin decoder for multi-standard video decoder. FIG. 4 illustrates an example of flowchart for a bin decoder to support both HEVC and AVS coding standard. The multi-standard bin decoder determines whether the bin decoding is for HEVC or AVS as shown in step 410. If it is for AVS, the AVS context table is initialized in step 420. If it is for HEVC, the HEVC context table is initialized in step 430. After the context table is initialized, the remaining bin decoding process can be performed accordingly as shown in steps 440 through 460. In step 440, a context model is determined based on neighboring data and syntax information is decoded. In step 450, the syntax bin is decoded. In step 460, the context model is updated. The bin decoder then checks whether it is the end of a slice in step 470. If the result is "Yes", the bin decoding process is terminated. If the result is "No", the bin decoding process loops back to step 440. FIG. 4 just illustrates one exemplary flowchart to implement a dual-standard bin decoder. A person skilled in the art may rearrange the functional blocks to achieve the same goal without departing from the spirit of the present invention. For example, the steps from 440 through 460 can be split into two sets of steps with one set for AVS and one set for HEVC.

Figure 5:
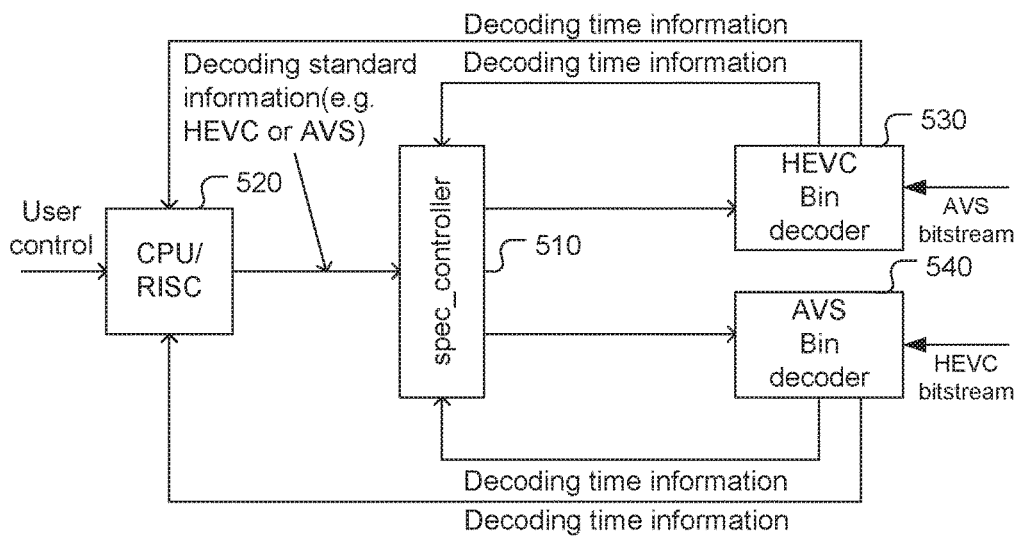
FIG. 5 illustrates an exemplary block diagram to support multi-standard bin decoder for a dual HEVC and AVS decoding system.

FIG. 5 illustrates an exemplary block diagram to support multi-standard bin decoder for a dual HEVC and AVS decoding system. A standard selection module (i.e., spec_controller 510) is used to select a corresponding bin decoder to perform the bin decoding task. The standard selection module is also referred as standard change control module in this disclosure. The selection information may come from CPU (520), where the CPU may determine the video coding standard of an underlying bitstream based on parsed syntax information. Decoding standard information is then passed to the standard selection module. According to the selected video coding standard, the standard selection module will direct the bin strings to the bin decoder (530, 540) of the selected video standard. Corresponding information such as initial context table will be provided to the selected bin decoder. While a CPU is shown in FIG. 5, the CPU may use reduced instruction set computing (RISC). Depending on system requirement, a microprocessor or a microcontroller may be used to replace the CPU.

The decoding time information for the respective bin decoder can be provided to the CPU, the spec_controller or both. The decoding time information is useful for the CPU, the spec_controller or both to schedule the source change. The compression efficiency of HEVC is better than AVS, because HEVC involves more efficient coding tools. The AVS decoder has lower complexity than the HEVC. Therefore, a HEVC slice is likely to consume more time to decode the bin strings for the slice. In the case that the bin decoding process for a AVS slice has been completed sooner than an allocated time and the bin decoding for a HEVC slice is still running after an allocated time, the CPU, the spec_controller or both can choose the HEVC bin decoder for the next slice. Accordingly, the multi-standard bin decoder with source change control taking into account of decoding time information feedback will be able to reduce the overall decoding time for the bin strings corresponding to a high-complexity video coding standard.

FIG. 5 also shows a user control can be provided to the CPU for selecting or changing the video coding standard. For example, a user may decide to terminate the video showing in the sub-picture and only watch the main program. Upon the user's input, the CPU may cause the spec_controller to only decode the selected video standard and disable the other standard. Furthermore, upon a user input, the spec_controller may also resume decoding of bin strings for all video coding standards.

Figure 6:
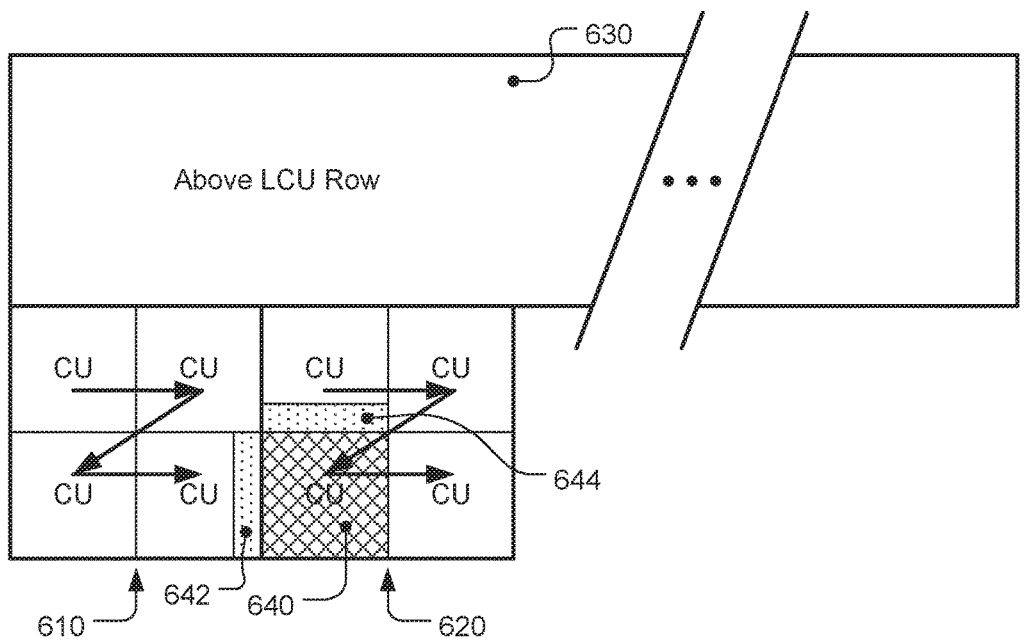
FIG. 6 illustrates an example of data dependency on neighboring information for bin decoding, where the bin decoding process for the current coding unit requires decoded information from left CU and above CU.

For context based entropy coding, the bin encoding and decoding will rely on neighboring coded and decoded information respectively. FIG. 6 illustrates an example of data dependency on neighboring information for bin decoding, where the bin decoding process for the current coding unit (640) requires decoded information from left CU (642) and above CU (644). In this example, each of the two largest coding units (LCUs 610, 620) is partitioned into four coding units (CUs). The processing order within each LCU is indicated by the arrows. In order to improve processing efficiency, the neighbor information associated with neighboring CUs (i.e., the left CU and the above CU) is temporarily stored in a buffer. The neighbor information associated with neighboring CUs may be used by other CUs in the same LCU or other CUs in a neighboring LCU in the same LCU row. After the CUs in the same LCU and other CUs in the left LCU are decoded, the neighbor information stored in the buffer can be released. In other words, once the neighbor information will not be used in the following several LCUs, the neighbor information stored in the buffer can be released. Accordingly the buffer for storing decoded information from neighboring CUs in the same LCU or other CUs in a neighboring LCU in the same LCU row is referred as "short term neighbor buffer". The contents in the "short term neighbor buffer" usually last for several CU or block periods. The decoded neighbor information used for context formation may comprise coding parameters such as pred_mode, pcm_flag and intra_flag. While a CU is used as a basic processing unit for coding, other coding standards may use different basic processing units for coding. For example, the CU is equivalent to a block and the LCU is equivalent to a macroblock in H.265/AVC and AVS. The neighbor information may also be used by CUs in another LCU row. Since the picture may be processed from one LCU row and another LCU row. The neighbor information may need to be stored for a whole LCU row (e.g. above LCU row 630). Therefore, the neighbor information storage as required for other LCU row or other macroblock row is referred as "neighbor data storage", which is much long term than that stored in the short term neighbor buffer. Since the storage space required by the "neighbor data storage" is much larger than the "short term neighbor buffer", the "neighbor data storage" may be implemented using external memory or internal memory (i.e., on-chip memory).

Figure 7:
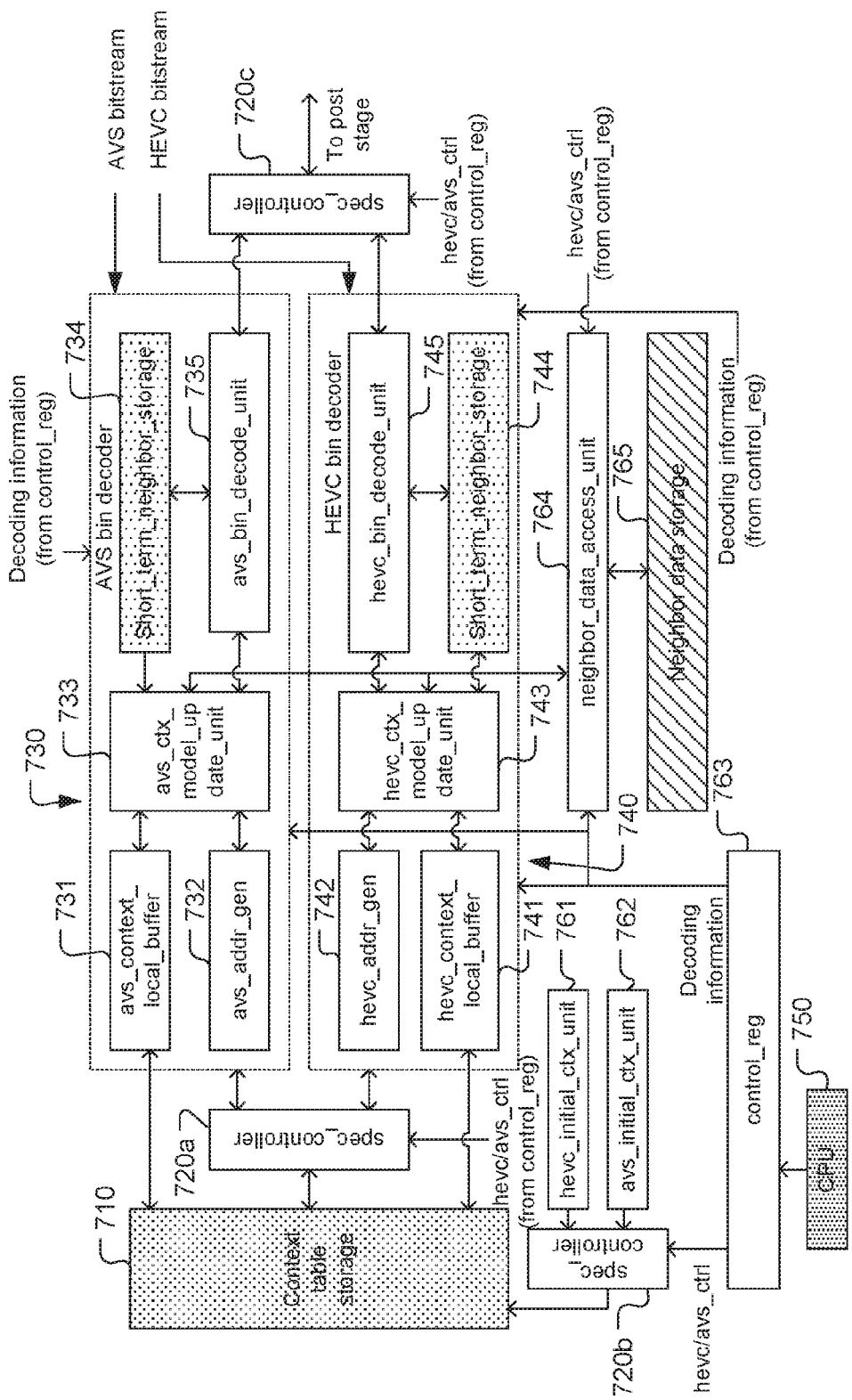
FIG. 7 illustrates an example of more detailed system structure for the dual-standard bin decoder in FIG. 5.

FIG. 7 illustrates an example of more detailed system structure of the dual-standard bin decoder in FIG. 5. Block 730 represents the bin decoder for AVS and block 740 represents bin decoder for HEVC. The spec_controller (720b) will cause the corresponding initial context table unit for HEVC or AVS (761, 762) to initialize the corresponding context table at the beginning of a picture or slice under the control signal hevc/avs_ctrl from control register control_reg (763). The control register (763) also provides decoding information to bin decoders (730, 740) and neighbor_data_access_unit (764). On the other hand, the neighbor_data_access_unit (764) is connected to neighbor data storage (765) and context model update units for AVS and HEVC (733, 743) in order to provide needed neighbor data for context model update. The CPU (750) is connected to the control register (763) to store the decoding information for the bin decoders. The spec_controller (720a, 720c) is also used to select input to the bin decoders (730, 740) and select output from the bin decoders (730, 740).

Each bin decoder includes a context local buffer (731, 741), address generator (732, 742), a context model update unit (733, 743), short term neighbor storage (734, 744) and bin decode unit (735, 745). The address generator (732, 742) will generate address for context table storage. The context model update unit (733, 743) is used to generate new context model and update context model stored in context local buffer (731, 741) during bin decoding. The bin decode unit (735, 745) performs the task of binary arithmetic decoding or bypass decoding using the updated context model from the context model update unit (733, 743). The decoded output from the bin decode unit (735, 745) is selected by spec_controller (720c) and provided for further video decoding process. The detailed structure for multi-standard bin decoder in FIG. 7 is intended for an example to implement the multi-standard bin decoder according to the present invention.

The functional blocks may be rearranged differently to practice the present invention without departing from the spirit of the present invention. While AVS and HEVC standards are used as two different video coding standards, other coding standards, such as H.264/AVS, AVS2 and WMV, may also be used.

As shown in FIG. 7, some storage blocks are required to support the bin decoding function. For example, context local buffer (731, 741) is used for storing context model of bin decoding; neighbor data storage (765) is used for storing neighbor information associated with the neighbor CTU/MB used to calculate index for context model access; and short term neighbor storage (734, 744) is used for storing short-term neighbor information such as left/top/previous block/CU/TU syntax within a larger unit (e.g. MB or LCU). The neighbor data storage (765) can be external or internal memory. The short-term neighbor information is used to generate address for context model access/update of current block/CU/TU.

Figure 8:
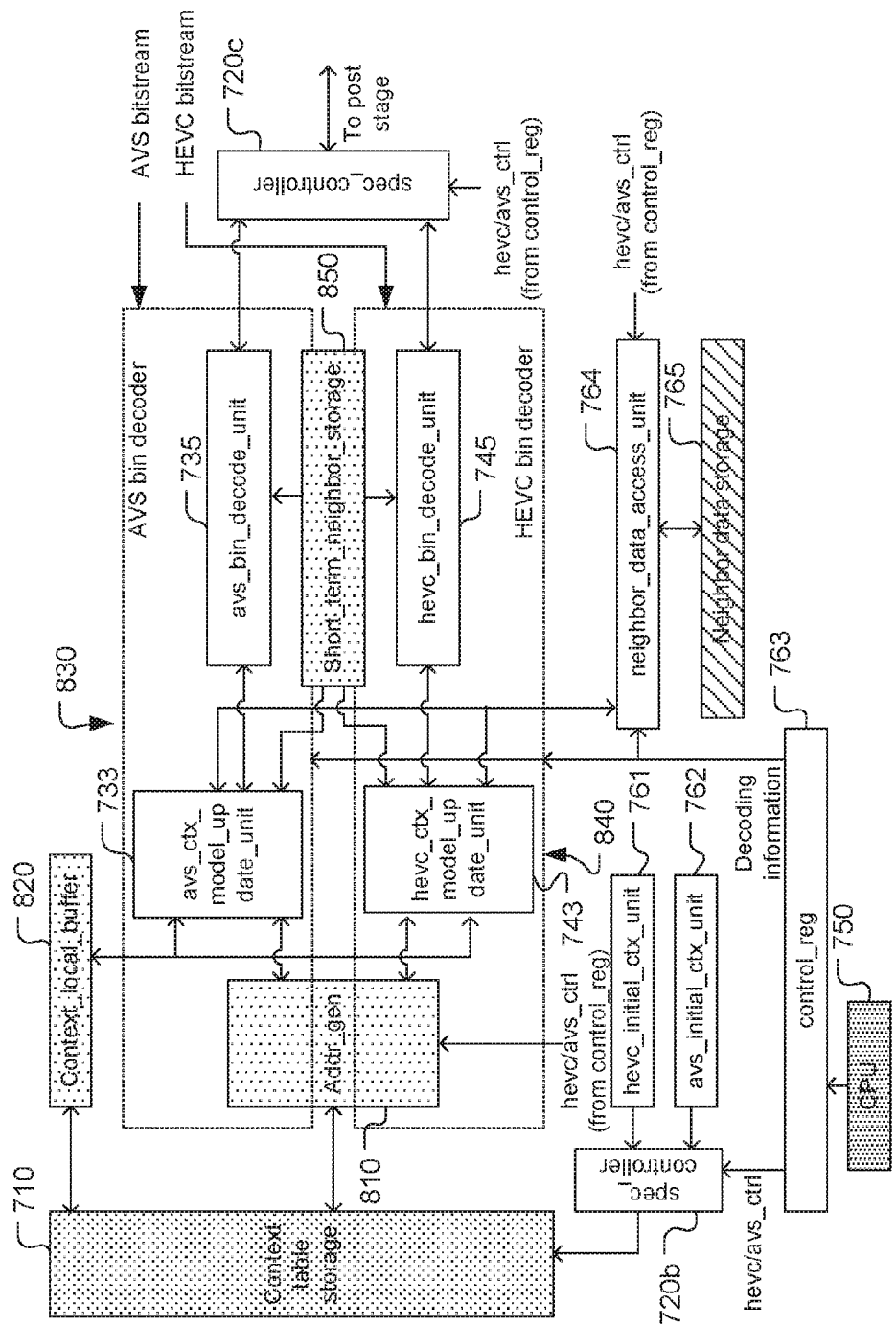
FIG. 8 illustrates another embodiment of the present invention, where some storage or functional blocks are shared between the AVS bin decoder and the HEVC bin decoder.

FIG. 8 illustrates another embodiment of the present invention, where some storage or functional blocks are shared between the AVS bin decoder and the HEVC bin decoder for chip area efficient implementation. The blocks that may be the same as those in FIG. 6 are indicated by the same reference numbers. As shown in FIG. 8, the AVS bin decoder (830) and HEVC bin decoder (840) are simplified with some shared storage or functional blocks, including address generator (810), context local buffer (820) and short term neighbor data storage (850). While the address generator (810), context local buffer (820) and short term neighbor data storage (850) are all shared in FIG. 8, the multi-standard bin decoder may use any combination of these shared functional blocks. For example, the multi-standard bin decoder may only use shared context local buffer (820) and neighbor data storage (850). Furthermore, the shared modules are shown external to individual bin decoders or joined between individual bin decoders. However, these shared modules may be embedded in one of the individual bin decoders. For example, the short term neighbor data storage (850) can be embedded inside the AVS bin decoder and shared by the HEVC bin decoder. Alternatively, the short term neighbor data storage (850) can be embedded inside the HEVC bin decoder and shared by the AVS bin decoder.

The present invention discloses multi-standard bin decoder for area-efficient or high performance implementation. The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. An apparatus for multi-standard bin decoding in a video decoder for decoding two videos coded in two different video coding standards, the apparatus comprising:
    a first bin decoder to decode one or more first bin strings, wherein each first bin string is generated according to a first video coding standard and the first bin decoder comprises:
    a first context local buffer to store a first local context table fetched from context table storage;
    a first short term neighbor buffer to store first short-term neighbor information associated with a current first processing unit within a larger first unit coded in the first video coding standard;
    a first address generator to generate first address for fetching the first local context table from the context table storage; and
    a first bin decoding unit coupled to the first context local buffer to apply context-based bin decoding to each first bin string using only the first local context table in the first context local buffer; and
    a second bin decoder to decode one or more second bin strings, wherein each second bin string is generated according to a second video coding standard and the second bin decoder comprises:
    a second context local buffer to store a second local context table fetched from the context table storage;
    a second short term neighbor buffer to store second short-term neighbor information associated with a current second processing unit within a larger second unit coded in the second video coding standard;

a second address generator to generate second address for fetching the second local context table from the context table storage; and a second bin decoding unit coupled to the second context local buffer to apply context-based bin decoding to each second bin string using only the second local context table in the second context local buffer; and wherein the first context local buffer and the second context local buffer share a common context local buffer, the first short term neighbor buffer and the second short term neighbor buffer share a common short term neighbor buffer, the first address generator and the second address generator share a common address generator, or any combination thereof.

2. The apparatus of claim 1, wherein the first video coding standard corresponds to AVS video coding standard and the second video coding standard corresponds to HEVC (High Efficiency Video Coding) standard.

3. The apparatus of claim 1, wherein the current first processing unit and the current second processing unit correspond to a block, a coding unit (CU) or a transform unit (TU).

4. The apparatus of claim 3, wherein the larger first unit and the larger second unit correspond to a coding tree unit (CTU) when the current first processing unit and the current second processing unit correspond to the coding unit (CU) or the transform unit (TU), or the larger first unit and the larger second unit correspond to a macroblock (MB) when the current first processing unit and the current second processing unit correspond to the block.

5. The apparatus of claim 1, wherein the first bin decoder further comprises a first context model update unit coupled to the first bin decoding unit, the first context local buffer, the first short term neighbor buffer and the first address generator to generate new first context model and to update the first context model stored in the first context local buffer during bin decoding for each first bin string, and wherein the second bin decoder further comprises a second context model update unit coupled to the second bin decoding unit, the second context local buffer, the second short term neighbor buffer and the second address generator to generate new second context model and to update the second context model stored in the second context local buffer during bin decoding for each second bin string.

6. The apparatus of claim 1, further comprising: a standard change control module coupled to the first bin decoder and the second bin decoder, wherein the standard change control module configures a corresponding bin decoder for the first bin decoder or the second bin decoder according to a respective video coding standard for a current first slice or picture coded in the first video coding standard or a current second slice or picture coded in the second video coding standard.

7. The apparatus of claim 6, wherein the standard change control module receives decoding time information from the first bin decoder or the second bin decoder for the current first slice or picture or the current second slice or picture after being bin decoded.

8. The apparatus of claim 6, wherein the standard change control module selects either a next first slice or picture or a next second slice or picture to be bin decoded according to the decoding time information.

9. The apparatus of claim 6, further comprising a system controller coupled to the standard change control module, the first bin decoder and the second bin decoder, wherein the system controller provides decoding standard information associated with a respective video coding standard of the current first slice or picture or the current second slice or picture to the standard change control module.

10. The apparatus of claim 9, wherein the system controller the decoding time information, and the system controller selects either a next first slice or picture or a next second slice or picture to be bin decoded according to the decoding time information.

11. The apparatus of claim 9, wherein the system controller further receives user control to terminate or resume bin decoding for said one or more first bin strings associated with the first video coding standard or said one or more second bin strings associated with the second video coding standard.

12. The apparatus of claim 6, further comprising a second standard change control module coupled to the first bin decoder and the second bin decoder to select an output from the first bin decoder or the second bin decoder according to the respective video coding standard.

13. The apparatus of claim 1, further comprising a first initial table unit coupled to the context table storage to initialize a first context model associated with the first bin decoder at first picture start or first slice start and a second initial table unit coupled to the context table storage to initialize a second context model associated with the second bin decoder at second picture start or second slice start.

14. The apparatus of claim 1, further comprising neighbor data storage to store first neighbor information associated with the larger first unit and second neighbor information associated with the larger second unit.

15. The apparatus of claim 1, wherein the first short-term neighbor information associated with the current first processing unit comprises one or more first syntax elements of a left first processing unit, an above first processing unit or a previous first processing unit of the current first processing unit, and wherein the second short-term neighbor information associated with the current second processing unit comprises one or more second syntax elements of a left second processing unit, an above second processing unit or a previous second processing unit of the current second processing unit.

* * * * *